United States Patent [19]

McCallum

[11] 3,935,659
[45] Feb. 3, 1976

[54] PHOSPHORESCENT FISHING LURE
[76] Inventor: James B. McCallum, Wendham St., R.F.D. No. 3, Plymouth, Mass. 02360
[22] Filed: Oct. 29, 1974
[21] Appl. No.: 518,562

[52] U.S. Cl. ................ 43/17.6; 43/42.32; 43/42.51
[51] Int. Cl.² .......................................... A01K 85/00
[58] Field of Search ..... 43/17.6, 17.5, 42.32, 42.24, 43/42.51, 44.98, 42.33

[56] References Cited
UNITED STATES PATENTS

| 284,056 | 8/1883 | Pflueger | 43/17.6 |
|---|---|---|---|
| 336,953 | 3/1886 | Scotland et al. | 43/17.6 |
| 1,612,264 | 12/1926 | Cressey | 43/17.6 |
| 1,833,241 | 11/1931 | Wright | 43/17.6 |
| 2,833,079 | 5/1958 | Flaska | 43/42.51 |
| 3,405,474 | 10/1968 | Lewis | 43/42.24 |

Primary Examiner—Warner H. Camp
Attorney, Agent, or Firm—William C. Roch

[57] ABSTRACT

A fishing lure having a phosphorescent material applied thereto, which after irradiation will itself radiate light. A first embodiment of the invention illustrates a fishing spoon which is adapted to rotate in the water, and which has a phosphorescent coating applied to one section of the lure such that as the lure is trolled through the water it appears to flash on and off. A second embodiment of the invention illustrates an artificial plastic worm which has embedded in its translucent body a strip of phosphorescent material.

1 Claim, 2 Drawing Figures

PHOSPHORESCENT FISHING LURE

BACKGROUND OF THE INVENTION

The present invention relates generally to fishing lures, and more particularly pertains to a new class of fishing lures adapted to radiate light as they are trolled through the water.

In the age old contest between man and fish, known affectionately to a few as fishing, the fish has often emerged the victor swimming sway nonchalantly while the dejected fisherman left empty handed. This protracted battle has been fought on many grounds with man occasionally winning a skirmish here or there with the introduction of new and more effective fishing equipment which reflected the latest technological advances of society. The present invention relates to one of those inroads against the so-far victorious fish, and might result in a major victory for mankind. More particularly, the present invention relates to a new and improved fishing lure which should enable diligent fishermen to spar more effectively with the enemy.

It is generally believed, and occasionally proved to be true, that fish are either more ravenously hungry or more careless at dawn, dusk, and throughout the nocturnal hours, Further, even during diurnal hours many fish prefer the darkness of the deep six. This darkness may take the form of a deep spot in the water or may be a section of the water from which light is blocked as by lily pads or seaweed. The present invention was conceived to take advantage of the aforementioned nature of fish, and more particularly was designed particularly for use during dawn, dusk, and nocturnal hours. Although it should be borne in mind that a lure embodying the teachings of this invention might also be very effective during the daytime and particularly in darkened waters.

SUMMARY OF THE INVENTION

In accordance with a preferred embodiment a fishing lure is disclosed which is especially adapted to glow and thereby attract fish. The fishing lure has a lure body adapted to attract fish for feeding purposes and has at least one hook coupled thereto. Further, the lure body has a phosphorescent material which after being irradiated will itself radiate light to make the lure more conspicuous, and especially in darkened waters. Further, one disclosed embodiment has the phosphorescent material applied to an exterior surface of the lure body, and a second disclosed embodiment has the phosphorescent material applied to an internal section of the lure body. Further, in one embodiment the phosphorescent material is a phosphorescent tape, and in a second embodiment the phosphorescent material is a phosphorescent paint.

DESCRIPTION OF A PREFERRED EMBODIMENT

Figure 1:
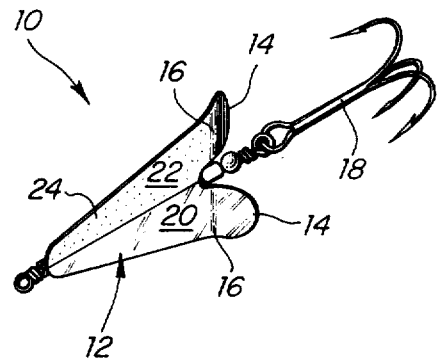
FIG. 1 illustrates a first embodiment of Applicant's invention wherein a phosphorescent coating is applied to an external surface of a fishing spoon.

Referring to FIG. 1, there is illustrated a first embodiment of Applicant's invention. A fishing lure 10 has a body 12 having tail section 14 provided with portions bent at an angle in opposite directions at 16 such that as the fishing lure is trolled through the water the bent tail sections 14 will cause the lure body to rotate. The fishing lure includes a typical treble hook 18 attached to its end. One half 20 of the lure body has a shiny metal surface adapted to reflect light. A second half 22 of the fishing lure body has a phosphorescent tape 24 applied thereto. Phosphorescent tapes are commercially available from several sources. In an alternative embodiment, the lure may have a phosphorescent paint, such as is available from Fischer Scientific Company, applied to section 22.

A distinction should be made between phosphorescent materials, which after irradiation (particularly by ultraviolet light) do themselves radiate light, and fluorescent materials which merely appear to be particularly bright and loud. There are currently several fishing lures on the market having fluorescent materials applied to the lure body, but it is not believed that there are any fishing lures available having phosphorescent materials thereon. This distinction is very important as in darkened waters the emission of radiation by the phosphorescent material will cause the lure to be very conspicuous to fish, while in those same darkened waters a fluorescent lure will not be nearly as effective as it merely reflects what little light is around.

Figure 2:
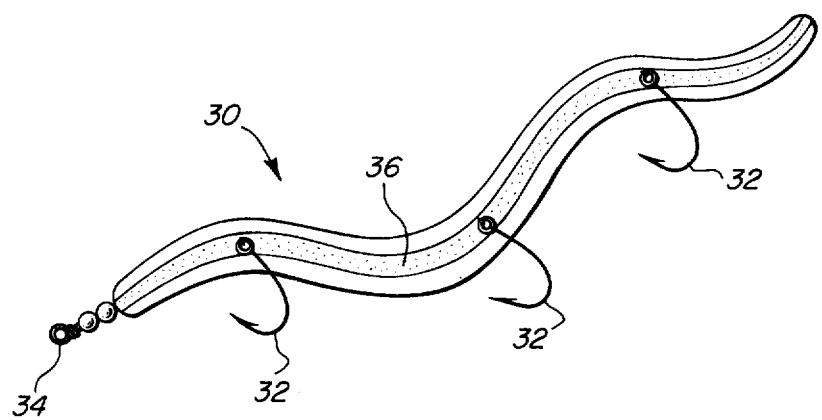
FIG. 2 shows a second embodiment of Applicant's invention wherein a strip of phosphorescent material is placed on the interior and along the length of a translucent artificial worm.

Referring to FIG. 2 there is illustrated a second embodiment of Applicant's invention in the form of a fishing lure 30 which is an artificial worm. The lure 30 includes a plurality of hooks 32 attached to the underside of the lure. The hooks are normally attached to a tieing eye 34 by a leader which runs down the center of the lure. In accordance with the teachings of Applicant's invention, the leader itself is formed of a phosphorescent material 36, and the hooks are attached to the phosphorescent leader. In alternative embodiments a strip of phosphorescent material may be placed in the lure in addition to the leader during manufacture. Alternatively, phosphorescent paint or phosphorescent powder may be embedded in the lure body during manufacture.

Fishing lures embodying the teachings of this invention might be utilized very effectively at night with an appropriate light. If the phosphorescent material is a type which reacts to ultraviolet radiation, then a black light might be required. In those situations this might be combined very effectively with an electronic insect killer which radiates black light. Under those circumstances, the lure would be exposed to radiation from the light source at periodical intervals during the evening.

In the preferred embodiment of Applicant's invention, only a small portion, such as one-quarter or one-third of the lure body, is covered with a phosphorescent material. The covering of a small portion with phosphorescent material more accurately simulates bait fish and bait which the lure is attempting to copy. In fact, many types of bait are phosphorescent, as may be noted during a walk along the seashore at night. As the waves break, many types of phosphorescent lights may be seen in and around the surf. Thus, the phosphorescent nature of Applicant's invention somewhat duplicates nature. In lure types, as the type illustrated in FIG. 1, wherein the lure undergoes some type of periodic motion, the coating of one small surface of the lure should be particularly effective as that small surface will appear to a fish to intermittently flash on and off. Indeed, this might simulate the erratic nature of a wounded or dieing bait fish.

While several embodiments have been described, the teachings of this invention will suggest many other embodiments to those skilled in the art.

I claim:

1. An improved fishing lure especially adapted to glow and thereby attract fish and comprising:
   a. a translucent fishing lure body being adapted to attract fish for feeding purposes;
   b. a leader running along the inside of said fishing lure body to couple hooks to the fishing lure body;
   c. at least one hook coupled to said leader to hook a fish attempting to eat the lure body; and
   d. said leader being formed of a phosphorescent material which, after being subjected to irradiation will itself radiate light, whereby the fishing lure will be more conspicuous, especially in darkened waters, and will attract more fish.

* * * * *